United States Patent [19]
Kozakiewicz et al.

[11] Patent Number: 5,705,561
[45] Date of Patent: Jan. 6, 1998

[54] MOISTURE-CURABLE MODIFIED ACRYLIC COPOLYMER SEALANT COMPOSITION

[75] Inventors: Waldemar E. Kozakiewicz, Mayfield Heights, Ohio; David K. Potter, Guelph; Steven A. Young, Hillsdale, both of Canada

[73] Assignee: Tremco Incorporated, Beachwood, Ohio

[21] Appl. No.: 664,761

[22] Filed: Jun. 17, 1996

Related U.S. Application Data

[63] Continuation-in-part of Ser. No. 171,946, Dec. 22, 1993, abandoned.

[51] Int. Cl.$^6$ .................. C08K 5/54; C08F 30/08
[52] U.S. Cl. .................. 524/730; 526/279
[58] Field of Search .................. 526/279; 524/730

[56] References Cited

U.S. PATENT DOCUMENTS

| | | |
|---|---|---|
| 2,956,044 | 10/1960 | Merker. |
| 3,203,919 | 8/1965 | Brachman. |
| 3,453,230 | 7/1969 | Pitteddemann. |
| 3,951,893 | 4/1976 | Gander. |
| 4,026,826 | 5/1977 | Yoshida et al.. |
| 4,048,207 | 9/1977 | Jones. |
| 4,322,517 | 3/1982 | Deubzer et al.. |
| 4,478,990 | 10/1984 | Kohno et al.. |
| 4,491,650 | 1/1985 | Rizk et al.. |
| 4,788,254 | 11/1988 | Kawakubo et al.. |
| 4,837,401 | 6/1989 | Hirose et al.. |
| 4,900,773 | 2/1990 | Hartschen et al.. |
| 5,017,668 | 5/1991 | Yoshihoka et al.. |

FOREIGN PATENT DOCUMENTS

| | | |
|---|---|---|
| 3215843 | 11/1982 | Germany. |
| 5736109 | 2/1982 | Japan. |
| 5978220A | 5/1984 | Japan. |
| 3227312A | 10/1991 | Japan. |

*Primary Examiner*—Joseph L. Schofer
*Assistant Examiner*—N. Sarofim
*Attorney, Agent, or Firm*—Calfee, Halter & Griswold LLP

[57] ABSTRACT

A crosslinkable acrylic copolymer sealant composition has a stabilized viscosity in that the viscosity does not unduly increase nor does the material gel on storage for periods of time up to and including one year. The stabilized viscosity is unexpectedly achieved by adding moisture scavengers either before and/or during the polymerization of the various monomers. The sealant composition is suitable for use in high movement applications as well as to metal and glass substrates.

17 Claims, No Drawings

5,705,561

MOISTURE-CURABLE MODIFIED ACRYLIC COPOLYMER SEALANT COMPOSITION

CROSS REFERENCE

This application is a continuation-in-part of U.S. application Ser. No. 08/171,946, filed Dec. 22, 1993, now abandoned for "Moisture-Curable Modified Acrylic Polymer Sealant Composition".

FIELD OF THE INVENTION

The present invention relates to modified acrylic copolymers suitable for formulating one-part, moisture curable sealant compositions which are stable during storage but which rapidly cure upon exposure to ambient moisture, at about room temperature, to form a cured sealant exhibiting superior strength, elastic recovery, weatherability, and adhesion to a variety of substrate materials. More specifically, the invention relates to small molecule moisture scavengers, e.g., siloxanes which do not contain hydrogen abstractable moieties and which are added to the acrylic copolymer forming monomers. Such polymerized copolymers are stabilized with regard to subsequent viscosity buildup which could make them unsuitable for use such as a sealant after compounding with suitable additives and fillers.

BACKGROUND

Curable polyacrylate polymers incorporating organosilane monomers capable of free radical polymerization and containing hydrolyzable groups bonded to the silicon atom are well known and have been used, for example, as polymeric adhesion promoters and as primers for coatings. After curing, these known polyacrylate-organosilicon compositions, however, are generally tough, often brittle materials, which are unsuitable for joint sealing applications where elastic properties are required. Examples of such compositions are disclosed in U.S. Pat. Nos. 3,453,136; 3,951,893; 4,026,826 and 4,093,673.

U.S. Pat. No. 3,453,230 to Plueddemann relates to acrylate-organosilicon compositions which are disclosed as having "potential commercial utility as sealants, coatings, and molding compounds . . . " More specifically, the reference discloses a copolymer consisting essentially of 100 molar parts of vinyl ester or acrylate units; 1 to 8 molar parts of a (meth)acryloxyalkylsilane or vinylsilane; up to 50 molar parts of an optional vinyl monomer selected from the group generally consisting of ethylene, vinyl chloride, vinylidene chloride, vinyl acetate, styrene, acrylonitrile and butadiene; and from 0.5 to 4 molar parts of a mercaptosilane or mercaptan chain transfer agent. Sealant formulation utilizing the acrylate-organosilicon copolymers disclosed by the Plueddemann patent were found to be unacceptable for use as a high-movement sealant formulation on account of their poor cohesive and elongation properties.

The Plueddemann patent discloses that the compositions taught therein remain relatively stable in a sealed vessel. However, it has been found that sealant formulations held in a sealed vessel and containing the acrylo-organosilane copolymers disclosed by Plueddemann experience a doubling of the viscosity index within 90 days in the absence of suitable stabilizing agents, signifying a substantial loss of handling properties in a relatively short period of time.

Sealant formulations used as joint fillers in the construction industry generally contain high molecular weight polymers or copolymers in order to satisfy movement requirements due to thermal expansion of the substrate materials. To meet extrudability requirements, sealant formulations containing high molecular weight polymers or copolymers must also contain relatively large amounts of solvent to reduce the viscosity of the sealant formulation. High amounts of solvent are, however, undesirable in sealant formulations because they lead to pronounced shrinkage of the sealant formulation during curing, which, in turn, is recognized as being a potential source of sealant failure.

U.S. Pat. No. 4,478,990 to Sunstar relates to a room temperature curable elastic composition which is made from acrylate and vinylalkoxysilane monomers, and a mercapto chain transfer agent. However, as with Plueddemann, this sealant composition has an unacceptable viscosity increase with time.

SUMMARY OF THE INVENTION

Accordingly, an object of the present invention is to provide a sealant formulation containing a modified acrylic copolymer incorporating monomeric units having hydrolyzable silyl groups and having an average molecular weight such that relatively low quantities of solvent are required to provide the desired extrudability, whereby sealant failure due to shrinkage during curing is substantially eliminated or at least significantly reduced.

An important object of the invention is to provide a modified acrylic copolymer containing monomeric units having hydrolyzable silyl groups and which is suitable for incorporation into a one-part, moisture curable sealant composition having an excellent balance of good viscosity stability, handling, and anti-sag properties prior to curing; having superior ultimate cured properties such as good elongation, suitable tensile strength, good adhesion to a variety of substrates, good weatherability and flexibility; and having a rapid cure time such that the ultimate cured properties are rapidly attained upon exposure to ambient moisture at about room temperature.

Another object of the invention is the utilization of a moisture scavenger during the polymerization of the various monomers to prevent hydrolysis of said silyl groups on the polymerization reactants or the polymer formed. The use of a moisture scavenger during polymeriztion was found to retard subsequent viscosity buildup as after compounding where small and inadvertent quantities of water might be introduced into the sealant formulation.

It has been discovered that modified acrylic copolymers containing reduced levels of organosilane monomers incorporated into the copolymer backbone, when used in a sealant formulation in accordance with the invention, unexpectedly achieve improved elongation, modulus, and adhesion to various building material substrates, such as glass and aluminum, while retaining ultimate tensile strength. More particularly, it has been found that in order to achieve dramatic improvements in elongation, modulus and adhesion, while retaining often desirable properties, it is necessary to use an acrylic copolymer containing a lower level of total (meth) acryloxyalkylsilane monomer, vinyl silane monomer, and mercaptosilane chain transfer units than are specifically taught by U.S. Pat. No. 3,453,230 to Plueddemann.

In accordance with another aspect of the invention, the acrylic copolymers having reduced levels of organosilane monomeric units relative to the prior art are utilized in a sealant formulation containing a mixture of di- and trifunctional organosilane crosslinkers which also serve as moisture scavengers to provide for a combination of improved storage stability and excellent sealant properties. The mixture of di- and trifunctional silane crosslinkers is believed to result in lower crosslinking densities than would otherwise occur if, for example, only tri or tetrafunctional crosslinkers were used; thereby preventing over-crosslinking upon curing whereby an unexpectedly superior combination of cohesive strength, adhesive strength, flexibility, and high movement are achieved in the cured sealant formulation.

In accordance with a further aspect of the invention, it has been discovered that lower molecular weight aliphatic monohydric alcohols when used with the acrylic copolymer and organosilane crosslinkers of the invention as a solvent/ additive achieve improved sealant properties. In particular, it was found that unexpected improvements in elastic recovery were realized without any accompanying deleterious effects on other important sealant properties when an alcohol was added as a solvent or co-solvent additive.

The acrylic copolymers, organosilane crosslinkers and monohydric solvents of the invention individually and collectively contribute toward achievement of a high movement sealant formulation suitable for sealing building joints and which exhibits superior cohesive strength, adhesive strength, elongation, elastic recovery, storage stability, anti-sag properties and handling properties.

DETAILED DESCRIPTION OF THE PREFERRED EMBODIMENTS

The acrylic copolymers of the invention are formed by any suitable free radical initiated chain polymerization process including bulk, solution, suspension or emulsion polymerization. However, because the acrylic copolymer of the invention includes organosilane monomers having hydrolyzable groups which serve as crosslinking sites upon exposure to moisture, it is important that the polymerization be performed in the absence of any significant quantity of water which would cause premature hydrolysis of the organosilanes and subsequent reaction with one another to form siloxane linkages. The acrylic copolymers are most preferably formed by free radical initiated solution polymerization wherein the type of solvent and the amount of solvent are preferably selected such that the solvent is substantially unreactive with the monomers and does not significantly affect the polymerization such as by contributing a significant chain transfer effect. Accordingly, solvent levels are preferably kept relatively low such as to constitute less than about 50 percent by weight of the reaction solution. Suitable solvents for the free radical initiated polymerization of acrylic copolymers incorporating polymerizable monomers containing hydrolyzable groups bonded to a silicon atom are well known to the art and literature and include benzene, toluene, xylene, chloroform, carbon tetrachloride, methyl acetate, ethyl acetate, ethylene dichloride, acetone, dioxane, tertiary butyl alcohol and others, with aromatic and aliphatic hydrocarbons being preferred.

The comonomers used to form the acrylic copolymers of the invention include at least one acrylate or methacrylate monomer, at least one silane functionalized addition monomer such as an acryloxy alkyl silane, a methacryloxy alkyl silane or a vinyl silane monomer containing up to three hydrolyzable groups bonded to the silicon atoms thereof, an optional, but highly desirable, vinyl addition type comonomer for modifying and enhancing physical properties such as cohesive strength, and an optional, but highly desirable, mercapto silane chain transfer agent having up to three hydrolyzable groups bonded to the silicon atom thereof. Moisture scavengers are also utilized during the preparation or polymerization of the acrylic copolymers to stabilize the same against undue viscosity buildup. Such moisture scavengers are generally silane-containing compounds.

At least one acrylate monomer, methacrylate monomer or combinations thereof generally constitute the primary monomer or major portion of the copolymer and are primarily responsible for the properties thereof. Suitable acrylate and methacrylate monomers include those represented by the formula

Formula 1 where R' is either hydrogen or a methyl group, and $R^2$ is an alkyl group containing from 1 to about 9 carbon atoms. Examples include ethyl acrylate, 2-ethyl hexyl acrylate, ethyl methacrylate, butyl acrylate and the like. The particular monomer or combination of monomers employed depends primarily on the physical properties desired, especially upon the desired flexibility of the polymer, it being well known that polymer flexibility can be altered by varying the size of the alkyl substituent on the acrylate monomer. The preferred primary monomers for the acrylic copolymers of the invention include acrylates having from 2 to 6 carbon atoms with the most preferred primary monomer being butyl acrylate, which at present is believed to provide the best overall combination or balance of desirable properties for use in a sealant composition.

The silane functionalized additional monomers can be an acryloxy alkyl silane, methacryloxy alkyl silane or a vinyl silane addition monomer or combinations thereof which provide sites for crosslinking along the backbone of the copolymer upon exposure to moisture such as ambient humidity. The silane functionalized addition monomers are generally represented by the formula

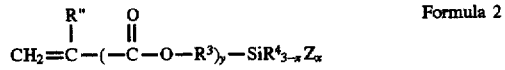

Formula 2 where R" is hydrogen or a methyl group, $R^3$ is a divalent alkylene group, y is 0 or 1, $R^4$ is an alkyl group of from 1 to 8 carbon atoms, Z is a hydrolyzable group, and x is 1, 2 or 3. Alkylene groups represented by $R^3$ in the above formula include methylene, ethylene, propylene, 2-methyl propylene, hexamethylene and the like. Suitable hydrolyzable groups include any of those known in the art and in the literature and include halogens such as chlorine or bromine, alkoxy groups such as methoxy or ethoxy, acyloxy groups such as acetoxy or propionoxy, ketoximo groups such as methyl ethyl ketoximo groups, alkoxyalkoxy groups and the like, with ketoximo and alkoxy groups being preferred and with methoxy and ethoxy groups being most preferred. Because of their lower cost and greater availability, trifunctional silane functionalized addition monomers, i.e. those wherein x is equal to 3, are preferred. Suitable silane functionalized addition monomers include methacryloxypropyl trimethoxysilane, acryloxy propyl triethoxysilane, vinyl trimethoxy silane, vinyl triethoxysilane, vinyl-tris(2-methoxyethoxysilane), vinyl-triacetoxysilane, methacryloxypropyl methyl dimethoxysilane, vinyl methyl dimethoxysilane and the like, with vinyl trimethoxy silane being preferred for its lower reactivity during addition polymerization and hence its ability to provide long chains of nonreactive polymeric units between reactive silane functionalized monomer units containing hydrolyzable crosslinking sites, whereby reduced crosslink density using a readily available silane functionalized monomer having a trifunctional pendent silyl group is achieved.

The silane functionalized addition monomers are utilized in lower levels than previously disclosed by the prior art in order to increase the length of the nonreactive portion of the polymer chain to provide reduced levels of crosslinking and thereby achieve better properties for use in a sealant composition than have been heretofore attained. Low levels of crosslinking are generally associated with lower modulus and higher elongation. Specifically, the amount of silane functionalized addition monomer utilized in the copolymerization of the acrylic copolymers of the invention is less than 1 molar part, preferably from about 0.05 to about 0.95 molar parts, and most preferably from about 0.5 to about 0.8 molar parts per 100 molar parts of the primary (meth)acrylate monomer.

The optional vinyl addition type comonomers are preferably utilized to impart enhanced properties such as improved tensile strength, shear strength and cohesive strength. The optional vinyl addition type comonomers are used in such amounts so as to achieve the foregoing enhancements, without seriously affecting other properties such as handling properties, elasticity, modulus, and the like in a deleterious manner. The optional vinyl addition type comonomers can be generally characterized as mono-olefinically unsaturated addition monomers which are free of hydrolyzable groups bonded to a silane atom and are generally unreactive to ambient moisture and constituents of the sealant formulation after incorporation into the acrylic copolymers of the invention. Suitable vinyl addition type comonomers for use with the invention include acrylonitrile and derivatives thereof having a total of from 3 to 8 carbon atoms such as methacrylonitrile, vinyl substituted aromatics having a total of from 8 to about 12 carbon atoms such as styrene, α-methyl styrene and the like, as well as other well known addition type comonomers used to enhance physical properties. The preferred vinyl addition monomers include styrene and acrylonitrile with acrylonitrile being the most preferred. The amount of optional vinyl addition type comonomers to be used depends primarily on the particular properties desired, the particular (meth) acrylate primary monomer, and the particular vinyl addition type comonomer selected. Suitable amounts of vinyl addition monomer range up to about 60 molar parts, more desirably from about 10 to about 50 molar parts, and most preferably from about 20 to about 40 molar parts per 100 molar parts of the (meth) acrylate primary monomer.

Chain transfer agents are preferably utilized during the free radical initiated polymerization of the acrylic copolymers of the invention to help control the number average molecular weight. Mercaptosilane chain transfer agents are preferably utilized to place crosslink sites at one end of the copolymer molecule in order to improve the cohesive strength of the cured sealant. Suitable mercaptosilane chain transfer agents for use with the invention have the general formula:

$$HS-R^5-SiR^6{}_{3-x}Z_x \qquad \text{Formula 3}$$

where $R^5$ is a divalent alkylene group desirably from 1 to 8 carbon atoms, $R^6$ is an alkyl group, x is 1, 2 or 3, and Z is a hydrolyzable group. The alkylene groups, alkyl groups, and hydrolyzable groups are generally the same or similar to those set forth with respect to the silane functionalized addition monomers. Suitable mercaptosilane chain transfer agents include γ-mercapto propyl triethoxysilane, γ-mercaptopropyl trimethoxy silane, mercaptomethyl methyl dimethoxysilane and the like, with γ-mercaptopropyl trimethoxy silane being preferred. The quantities of chain transfer agents used are similar to those disclosed in the prior art.

The free radical initiated copolymerization can be carried out at temperatures and pressures which are generally well known in the art. To simplify the process and apparatus, the copolymerization is preferably done at or near atmospheric pressure. In order to maximize randomization of monomer addition, the polymerization is preferably conducted at a temperature which is as near to the ceiling temperature of the polymer being formed as is possible without actually risking depolymerization. Of course, the minimum effective temperature is dependent upon the dissociation temperature of the selected free radical initiator. Suitable temperatures generally range from about 25° C. to about 200° C. The polymerization is preferably carried out at the reflux temperature of the reaction mixture, which is preferably from about 25° to about 200° C.

Generally, any of the free radical initiators known to the art can be utilized. Suitable free radical initiators include any of the acyl peroxides such as acetyl peroxide and benzoyl peroxide, alkyl peroxides such as t-amyl and t-butyl peroxides, hydroperoxides such as t-butyl and cumyl hydroperoxides, peresters such as t-butyl perbenzoate, any of the various known azo initiators such as 2,2'-azobisisobutyronitrile, as well as disulfide initiators, tetrazenes and the like. Particularly preferred are t-amyl peroxides. The amount of initiator utilized is generally consistent with the amounts specified by the prior art, and appropriate amounts of free radical initiator can be readily determined by those of ordinary skill in the art by taking into consideration the particular reaction conditions and desired final properties including the monomers used, the desired molecular weight distributions, the amount, if any, of chain transfer agents utilized, etc. Suitable amounts of free radical initiators generally are within the range from about 0.01 percent to 1 percent by weight based upon the total weight of all monomers.

In accordance with a preferred aspect of the invention, the copolymerization is performed in a semibatch reaction such that the monomers are fed into the reactor at a predetermined rate to compensate for differences in reactivity of the different monomers and thereby maintain substantially constant concentration ratios of the monomers during the copolymerization. Maintaining a constant monomer concentration ratio over the course of the polymerization will help to achieve a more uniform sequence length distribution (e.g. a polymer formed early in the polymerization will have about the same number of non-silyl containing repeat units between each pair of silyl containing repeat units as a polymer made near the end of the polymerization). An appropriate monomer feed protocol for a given copolymerization system can be readily determined by those skilled in the art by observing the monomer concentrations for a batch process and appropriately adjusting the monomer feed rates to use an excess of the poorly reacting monomers early in the polymerization and add higher amounts of the more reactive monomers later in the polymerization. Further adjustments and refinements of the monomer feed protocol can be made if necessary.

In order to reduce the risk of premature hydrolysis of the hydrolyzable groups bonded to the mercaptosilane chain transfer agent and to the silane functionalized addition monomers due to inadvertent exposure to small or incidental quantities of water, and to eliminate the need for ensuring that all of the constituents of the copolymerization reaction mixture are absolutely, or at least very nearly, completely free of moisture, various moisture scavengers which at times also can serve as suitable crosslinking agents are preferably introduced into the copolymerization reaction mixture. It is an important aspect of the present invention that the moisture scavengers be utilized during and optionally before polymerization of the above-noted monomers inasmuch as this has been found to stabilize the viscosity (e.g. prevent molecular weight increase due to reactions of hydrolyzed silyl groups on the polymers) of the copolymer as well as the subsequently compounded sealant composition. Suitable moisture scavengers include polyfunctional organosilanes having from two to four hydrolyzable groups. Moisture scavengers do not include the already present silane functionalized addition monomers nor the already present mercaptosilane chain transfer agents.

Suitable moisture scavengers include small molecule siloxanes which do not contain hydrogen abstractable moieties. Some stearic hinderance in the polyfunctional silanes is desirable as it allows the silanes to scavenge water while making it difficult for the silane after hydrolysis to function as a crosslinker. Thus iso-hydrocarbon compounds are preferred although normal, that is, unbranched long chain hydrocarbon compounds can also be utilized. Other small molecule polyfunctional silanes which are avoided during the polymerization stage include compounds which contain a nitrogen atom therein, because such compounds may have an adverse effect on the kinetics of the free radical polymerization. The amount of such avoided is generally less than 1 percent and desirably less than 0.25 and preferably 0 percent by weight based upon the total weight of all moisture scavenger compounds. Chlorosilanes and other halogenated silanes are also desirably excluded at this stage as they produce acids on hydrolysis which can accelerate hydrolysis of the alkoxy silanes. Suitable moisture scavengers preferably include various alkyl poly(alkoxysilanes) wherein the alkyl group desirably has from 1 to 10 carbon atoms and the alkoxy group has from 1 to 6 carbon atoms with methoxy or ethoxy being preferred. Examples of such compounds include isobutyltriethoxysilane (IBTES), isobutyltrimethoxysilane (IBTMS), n-octylsilane, methyltrimethoxysilane, n-octyltrimethoxysilane dimethyldimethoxysilane, trimethylmethoxysilane, n-propyltrimethoxysilane, tetraethylorthosilicate, dimethylketoximosilane, and the like. While tetrafunctional organosilanes provide better moisture scavenging efficiency per mole, trifunctional silanes are preferred because they provide adequate moisture scavenging efficiency and provide better overall properties in cured sealant compositions primarily due to lower crosslinking densities. Other examples include alkyl isopropenoxy silanes such as dimethyl diisopropenoxy silane, methyl triisopropenoxy silane, γ-glycidoxypropyl methyl diisopropenoxy silane and the like; alkoxy silanes having functional groups such as γ-glycidoxypropyl methyl dimethoxy silane, γ-glycidoxypropyl trimethoxy silane. While the various oxime silanes can be utilized such as dimethylmethylethyl ketoximosilane and the like, they are not preferred. The number of alkoxy groups within the silane can generally vary from 2 to 4 with 3 being preferred. The preferred moisture scavenger for use during the copolymerization of the acrylic copolymers of the invention is iso-butyltrimethyoxy silane or isobutyltriethoxy silane. The moisture scavengers are preferably used during the copolymerization in amounts ranging from about 0.25 to about 10, more desirably from about 0.5 parts to about 4 molar parts, and preferably from 1 part to about 2 molar parts per molar pair of radical polymerized silanes in the final polymer or, per molar part of copolymer since there are desirably 2 pendant silanes per polymer.

It is an important aspect of the present invention that the above-noted moisture scavengers are added before and/or during the polymerization of the above-noted monomers. That is, they can be added to the reaction vessel or to the monomers, etc., before polymerization is commenced, or during polymerization of the monomers. If they are not added until after the copolymers are formed, subsequent viscosity buildup including gel formation will not be inhibited or prevented. Test data has shown that if one or more of the above-noted moisture scavengers such as IBTMS is added to the polymerization vessel after polymerization is complete, viscosity buildup will nevertheless continue, especially after compounding when crosslinking agents are added. Such a viscosity buildup results in an undesirable and generally impractical acrylic copolymer sealant composition with regard to, a suitable end use.

The moisture scavenger reacts with or ties up a large percentage of any moisture thereby preventing the moisture from prematurely hydrolyzing the Z group of the silane functionalized addition monomer(s) or mercapto silane chain transfer agent into a pendant hydroxyl group and a free molecule such as alcohol. The retention of the Z groups on the silane functionalized monomers and mercaptan chain transfer agents prevents the silane portion of the molecules from forming a chemical bond to the silane portion of other silane functionalized monomers and mercapto silanes chain transfer agents. The silane functionalized addition monomers and mercapto silane chain transfer agent through free radical polymerization desirably result in pendant silane hydrolyzable groups on the backbone or terminal ends of the polymer. These are available for crosslinking the polymer chains into a network only after hydrolysis to silanol groups. Any premature conversion of the silane hydrolyzable groups on the polymer to hydroxyl groups on a silicon atoms (silanol group) increases the probability that the hydrolyzed pendant groups will react with each other causing coupling of polymer chains and viscosity increases.

As previously noted, the addition of the moisture scavenger results in stabilizing the viscosity of acrylic copolymer as well as stabilizing the viscosity of any subsequently compounded sealant composition. By the term "stabilized viscosity" it is meant that the viscosity of the sealant and polymer desirably increases less than 50%, more desirably less than 40 or 30%, and preferably less than 20% as measured by extrusion through a 6 mm diameter die within one year of storage at 23° C.

The polymerization reaction is desirably allowed to proceed to at least 99 percent monomer conversion and more preferably from about 99 to about 99.99 percent monomer conversion. The amount of time needed to achieve the desired degree of conversion is dependent on the polymerization conditions including the temperatures, pressures, monomers, chain transfer agents, initiators, etc.; however, suitable conversions are generally achieved in from about 3 hours to about 10 hours.

The acrylic copolymers of the invention generally have a number average molecular weight of from about 5,000 to about 40,000 and more preferably from about 15,000 to about 25,000, and a weight average molecular weight of from 10,000 to about 200,000 and more preferably from about 25,000 to about 100,000. The copolymers on average generally contain from about 1 to about 4, and most preferably contain about 2 organosilane units per molecule, and from about 2 to about 12 and most preferably about 6 hydrolyzable groups per molecule on average.

The acrylic copolymers of the invention were expected to have properties which make them suitable in various adhesive and coating formulations. However, sealant formulations utilizing the acrylic copolymers disclosed herein have been found to exhibit properties which are unexpectedly superior to those exhibited by similar formulations utilizing previously known acrylic copolymers.

The moisture curable sealant formulations of the invention generally comprise a blend of the acrylic copolymer, moisture scavengers, and crosslinkers disclosed hereinabove, as well as various conventional additives including fillers, pigments or colorants, theological modifiers, adhesion/promoters, solvents, curing catalysts, and the like.

Any of the various crosslinking agents for these silane functionalized polymers known to the art and literature can be used. Desired crosslinking agents include di, tri and tetrafunctional or higher functionality silanes (e.g. silanes with 2, 3, 4 or more hydrolyzable groups) which include vinyl containing silanes, tetraethylorthosilicate, mono and di alkyl poly(alkoxy silanes). Examples of such silanes include vinyltrimethoxysilane, vinyltriethoxysilane, vinyl-tris(2-methoxyethoxysilane), vinyltriacetoxysilane, methyltrimethoxysilane and the like.

However, in accordance with a preferred aspect of the invention, it has been discovered that a surprisingly good combination of storage stability, fast curing rates and excellent cured sealant properties is achieved by utilizing a combination of both di- and tri-functional crosslinkers, without any substantial quantities of tetra-functional or higher functionality crosslinkers. The combination of di- and tri-functional silane crosslinkers is believed to provide a crosslink density in the cured sealant composition which contributes to superior elastomeric properties needed for high movement sealants while simultaneously achieving or retaining other good sealant properties such as cohesive and adhesive strength, and good weatherability. The amount of difunctional crosslinker used is generally from about 0.5 to about 4, and preferably from about 1.1 to about 2.0, per 100 parts by weight of polymer. The preferred difunctional crosslinker include dialkyl dialkoxy silanes such as dimethyl dimethoxysilane, or vinyl methyl dimethoxysilane. However, various other di and trifunctionalsilane crosslinkers such as difunctional and trifunctional oximo curing agents such as dimethyl ethyloximosilane can be used.

The amount of trifunctional crosslinker used is generally from about 0.5 to about 10, and more preferably from about 1.5 to about 2.5, parts per 100 parts by weight of polymer. The preferred trifunctional crosslinker is vinyl trimethoxysilane. A trifunctional silane, isobutyltrimethoxysilane, as a preferred moisture scavenger, may also function as a crosslinker later during curing when all of its hydrolyzable groups are converted to hydroxyl groups pendant on a silicone atom (silanols). When used as a moisture scavenger it is added before or during the polymerization to help prevent premature hydrolysis of the hydrolyzable groups of the organosilane addition monomers and optional mercaptosilane chain transfer agents. In either case, the foregoing amounts refer to the total amounts of di- and tri-functional crosslinkers/moisture scavengers utilized without regard for whether they are added during the copolymerization of the acrylic copolymer or afterward.

In order to impart a desirable combination of handling, extrudability, and anti-sag properties, a rheological modifier, more specifically a thixotropic agent is preferably added to the sealant formulation. Preferred thixotropic agents include commercially available castor oil derivatives which are utilized in effective amounts such as from about 3 percent to about 8 percent, and more desirably from about 4 percent to about 6 percent by weight based on the total weight of the sealant formulation.

In order to improve adhesion between the sealant and a substrate such as glass or metal, any of various adhesion promoters known to bond tenaciously to non-porous substrates are preferably added to the sealant formulation. Suitable adhesion promoters contain polyfunctional silanes generally having three hydrolyzable groups which react with hydroxy or other oxygen containing groups present on the substrate and also with each other and with the acrylic copolymer, either directly through a hydrolyzed silane or through a crosslinker to facilitate better adhesion between the acrylic copolymer and the substrate. Examples include methacryloxytrimethoxysilane, γ-glicidoxypropyltrimethoxysilane, γ-aminopropyltriethoxy-silane, γ-aminopropyltrimethoxysilane and aminoalkyl-trimethoxy disilane. The preferred adhesion promoter for use in the sealant formulation of the invention is γ-aminopropyltriethoxysilane or γ-aminopropyltrimethoxysilane. The amount of adhesion promoter used in the sealant formulation is generally from 0.1 to 0.5, and more preferably from 0.1 to 0.3 parts by weight per 100 parts by weight of polymer.

Various inorganic fillers and extenders can be added to the sealant formulation to improve anti-sag properties. Examples include such fillers as silica, alumina, titania, glass powder or fibers, carbon black, powdered metals, clay, talc, magnesium oxide, magnesium hydroxide, calcium carbonate and the like. The presently preferred filler is calcium carbonate because it is commercially available in low moisture content form thereby avoiding drying requirements to prevent premature gelation of the acrylic copolymer whereas commercially available talc and clay, for example, must generally be dried to prevent premature gelation. The amount of filler utilized in the sealant formulation depends on the various other components and on the desired properties, but generally ranges from about 30 to about 100 and more preferably from about 65 to about 80 parts by weight per 100 parts by weight of polymer.

To promote rapid cure upon exposure to moisture, it is generally desirable to add a condensation or curing catalyst to the sealant formulation. Suitable condensation catalysts for curing the silane functionalized acrylic copolymer of the invention are well known and include any of the various alkali phenoxides, amines, carboxylic acid salts of metals, organic titanium compounds, and others disclosed, for example, in U.S. Pat. No. 3,453,230 to Plueddemann, the entire contents of which are hereby incorporated by reference herein. The amount of condensation catalyst used in the formulation should balance the rate of cure of the formulation against long term stability. It is, therefore, desirable to use the minimum amount of catalyst required to obtain the desired cure performance. The preferred pure or condensation catalysts are dibutyl tin diacetate (DBTDA) or dibutyl tin dilaurate which are preferably used in amounts ranging from 0.03 percent to 0.2 percent by weight based on the total weight of the sealant composition.

Any of various pigments or coloring agents can be utilized as desired. For example, titanium dioxide can be utilized as a colorant in combination with a calcium carbonate filler to obtain a very light colored sealant formulation.

To obtain a workable viscosity the total solids content of the sealant formulation can be adjusted by dilution using a solvent such as benzene, toluene, xylene, chloroform, carbon tetrachloride, methyl acetate, ethanol, isopropanol, or the like. The sealant formulations of the invention preferably have a total solids content of from about 98 percent to about 90 percent by weight.

In accordance with a particularly preferred aspect of the invention, it has been discovered that when small quantities of a lower molecular weight monohydric alcohol are added to the sealant formulation, unexpected improvements in elastic recovery are achieved as compared to more conventional solvents such as xylene. The preferred monohydric solvent is isopropanol.

The amount of solvent used depends on the desired properties and other components of the sealant composition, but amounts of isopropanol in the range of 1 to 10 percent by weight based on the total weight of the sealant formulation have been observed to provide significant enhancement of the elastic recovery as compared with similar formulations utilizing xylene.

Sealant formulations made in accordance with the foregoing principles have been found to achieve excellent stability and handling properties; rapid cure times at temperature near ordinary room temperature, as demonstrated by short skin formation times, short tack free times, and rapid attainment of ultimate cured properties; and excellent cured properties including good weatherability, cohesive strength, adhesive strength, high movement, high elasticity, elastic recovery, etc.

The following examples are intended to further illustrate the invention and to provide a better under standing thereof, and should not be construed as limiting the invention thereto.

Polymers were prepared in stainless steel reactors equipped with reflux condensers. Monomer/initiator streams were fed to the reactors using appropriate pumps.

Molecular weight distributions were measured using a Waters SEC equipped with DRI and Viscotek detectors. Monomer analyses were obtained from a Hewlett Packard GC using an SPB-5 methyl phenyl silicone capillary column.

The polymerizations were achieved in suitable solvent medium, with a portion of the solvent charged initially to the reactor and the remainder distributed among monomer, initiator and moisture scavenger feed streams. No special precautions to exclude moisture were taken in handling solvents, initiators and monomers, although silane monomers and crosslinkers were handled under a nitrogen blanket.

Polymers were prepared under reflux conditions or to a maximum temperature of 140° C. Monomer and initiator were fed into the reactor for two to three hours, dependent on protocol. The total process time was four and one half hours.

Sealants were compounded from the polymer using an Orbital Shaft Mixer. Additions of materials to the mixer were done under nitrogen atmosphere as follows. To the clean mixer the polymer and methyl trioximosilane were added and allowed to mix for about 3 minutes at 900 RPM. Castor oil based thixotrope and titanium dioxide were then added and allowed to mix for 5 minutes, after which calcium carbonate was added. After about 5 minutes of mixing the adhesion promoter and solvent (xylene) were added, followed by the dibutyl tin diacetate (DBTDA) catalyst and the rest of the solvent after a further 5 minutes of mixing. The contents of the mixer were heated to about 65° C. over a period of from about 20 to about 25 minutes. After about 10 minutes of mixing at temperatures between 65° C. and 68° C., the batch was allowed to cool to 50° C.

At this temperature, vacuum would be applied for about 5 minutes, while mixing, to deaerate the material. The mixer was then stopped and the vacuum broken using nitrogen gas. Scraping of the mixer was performed under the flow of nitrogen, and suitable cartridges were filled with the material using a hydraulic press.

Industry standard tests performed included:

1) Stability—by checking changes in the viscosity index over time (20 g of material extruded through a 0.104" orifice under 60 psi measure).

2) Cure Rate—by checking tack free time (method 2.1; CAN2-19.0-M77, and ASTM C679), and by checking hardness (Shore "A") development over time using a "Zwick" Duromatic measuring device.

3) Sag—using Boeing Jig Assembly (ASTM D2202).

4) Adhesion to Glass, Mortar, and Aluminum—peel adhesion tests according to method 14.6; CAN2-19.0-M77.

5) H-Bead Tensile—using tensile tests (Instron) according to method 14.1; CAN2-19.0M77.

6) Movement Capabilities on Glass, Primed and Unprimed Mortar—using cycling methods according to method 14.4, CAN2-19.0-M77, and ASTM C719.

7) Weathering—using Xenon Arc Weatherometer.

8) Elastic Recovery (ISO 7389).

EXAMPLES

Moisture Curable RTV Sealant Polymer

In accordance with the above general procedure, samples P1, P2 and P3 were prepared in a reactor which was initially purged with nitrogen, then charged with xylene and the temperature was increased to 140° C. at which point the solvent began to boil at reflux.

The Silane and Main feeds were premixed in separate containers and then metered into the reactor according to individual feed rate protocols. The silane functionalized addition, acrylonitrile, and acrylic monomers were metered separately to permit manipulation of the relative concentration of the reactively dissimilar monomers in the polymerization media. This practice is well known in free radical polymerization and helps control the composition of the resulting copolymer. Polymerization commences within 5–10 minutes. At the end of the two feeds, the conversion of monomer to polymer is about 90 percent complete.

To reduce residual monomers to less than 500 ppm (0.05 percent), the scavenger solution is metered to the reactor according to the prescribed protocol. Procedures to scavenge residual monomers are well known to the art. The entire process has taken place at the reflux temperature of the mixture.

The contents of the reactor are then cooled to less than 100° C. and any additional moisture scavenger or stabilizer is added in one shot, mixed and the mixture discharged into moisture tight containers.

An acrylic copolymer (designated P1) was prepared in accordance with the principles of the invention using the preferred monomers (butyl acrylate, acrylonitrile and vinyl trimethoxy silane), and the preferred chain transfer agent (mercaptopropyltrimethoxy silane). The polymerization mixture also included xylene as a solvent, ethyl-3,3-di(t-amylperoxy)butyrate as the free radical initiator, and isobutyltrimethoxysilane (IBTMS) was used as a moisture scavenger during the polymerization. Later when exposed to moisture the IBTMS will lose its hydrolyzable methoxy groups and act as a crosslinker. Dimethylmethylethylketoximosilane was added immediately after the polymerization process was completed to act as a moisture scavenger for the polymer. The acrylic copolymer P1 of the invention was prepared using the above-listed ingredients in the amounts shown in Table 1.

TABLE I

|  | P1 Parts by Weight | Molar Basis | P2 Parts by Weight | Molar Basis | P3 Parts by Weight | Molar Basis |
|---|---|---|---|---|---|---|
| Butyl Acrylate | 89.0 | 100 | 88.29 | 100 | 88.29 | 100 |
| Acrylonitrile | 10.0 | 27.1 | 10.00 | 27.2 | 10.00 | 27.2 |
| Vinyltrimethoxy Silane | 0.7 | 0.68 | 1.03 | 1.00 | 1.03 | 1.0 |
| Mercaptopropyl Trimethoxysilane | 0.3 | 0.22 | 0.68 | 0.50 | 0.68 | 0.50 |
| Xylene | 14.27 | — | 14.27 | — | 14.27 | — |
| Initiator | 0.17 | — | 0.17 | — | 0.17 | — |
| Moisture Scavenger (IBTMS) | 0.75 | 0.61 | 0.75 | 0.61 | 0.75* | 0.61* |

*Added after polymerization was completed.

For purposes of comparison to the prior art and preferred embodiment, a similar acrylic copolymer (designated P2) was prepared using the same monomers, solvents, initiator and scavengers, and using the identical apparatus and procedures, except that the amount of vinyl-trimethoxy silane and mercaptopropyl trimethoxysilane was set at the lowest possible level suggested by the prior art. The polymers from these low amounts of vinyltri-methoxysilane and mercapto propyl trimethoxysilane should result in the lowest viscosity suggested by the prior art.

A second (comparative example) acrylic copolymer (designated P3) was prepared in an identical manner using the same components and amounts except without any moisture scavengers being added during polymerization. Thus P3 is equivalent to the prior art. The compositions of examples, P2 and P3, are also set forth in Table I.

Table II shows properties for the preferred copolymer of the invention and for comparative copolymers prepared in accordance with the closest prior art.

Each of the copolymers P1, P2 and P3 were used in a sealant formulation having the following composition:

|  | PARTS BY WEIGHT |
|---|---|
| Copolymer (P1, P2 or P3) | 49.5 |
| Thixatrol ST | 5.4 |
| TiO$_2$ | 4.4 |
| Limestone | 37.04 |
| Methyltrimethylethylketoximosilane | 0.9 |
| γ-Aminopropyltri-methoxysilane | 0.2 |
| Dibutyltindiacetate | 0.06 |
| Xylene | 2.5 |

Various properties for the above sealant formulations using P1, P2 and P3, respectively, (designated S1, S2 and S3, respectively) after curing, are shown in Table III. The results indicate that the sealant formulation (S3) utilizing the prior art copolymer without the preferred silane moisture scavenger/crosslinkers added during the polymerization of the invention is relatively unstable as indicated by a doubling of the viscosity index to 190 in about 7 days. The results indicate that the copolymer of the invention (P1) can be used to obtain a sealant formulation (S1) having excellent anti-sag properties and a suitable hardness. The results demonstrate that the copolymers of the invention can be used to obtain sealant formulations having unexpectedly superior adhesion to glass and aluminum substrates as compared with the prior art. Mechanical testing also indicates that the sealant formulations utilizing the copolymer of the invention has excellent tensile strength for a cured sealant and is comparable to the prior art in this regard. The results demonstrate an unexpected improvement in strain and modulus, signifying vastly improved elastic properties which are highly desirable for high movement sealant formulations.

The above copolymer of the invention (P1) was also used in two substantially identical sealant formulations except that isopropyl alcohol was used in one of the sealant formulations (S5) as the solvent instead of xylene which was used in the other sealant formulation (S4). Each of the sealant formulations using the copolymer of the invention exhibited excellent handling and anti-sag properties, excellent peel adhesion properties, good mechanical properties, and each passed the ASTM C719 movement tests at ±25 percent movement for aluminum, glass and primed mortar substrates, as shown in Table IV. However, the sealant formulation wherein isopropyl alcohol was used as the solvent (S5) showed unexpectedly superior elastic recovery properties when subjected to ISO 7389 wherein the cured samples were stretched to 100 percent of their original length. The sealant formulation containing the isopropyl alcohol (S5) achieved 72 percent elastic recovery, whereas the other sealant containing the xylene solvent (S4), but otherwise identical, experienced cohesive failure prior to 100 percent elongation.

TABLE II

| Polymer | Crosslinker % | | RTI Viscosity | | Gel Permeation Chromatography Results | | | | | | |
|---|---|---|---|---|---|---|---|---|---|---|---|
| | | | | | Mn | Mw | Mz | | Skew | | |
| I.D. No. | IBTMS | DMOS | (Pa s) | Polymer Solids % | 000's | 000's | 000's | MW/Mn | (N) | (W) | Comments |
| P1 | 0.75 | 1.31 | 64.3 | 83.2 | 16.1 | 53.1 | 110.2 | 3.29 | 4.4 | 2.56 | example of the present invention |
| P2 | 0.75 | 1.31 | 37.8 | 83.1 | 15.3 | 45.0 | 86.8 | 2.94 | 3.65 | 2.09 | lowest described functional monomer |
| P3 | 0 | 0 | 46.4 | 85.1 | 13.9 | 51.0 | 117.6 | 3.67 | 5.05 | 2.83 | no moisture scavenger or stabilizer |

TABLE III

COMPARISON OF THE PRESENT POLYMER TO DOW PATENT VERSIONS IN THE STANDARD SEALANT FORMULATION

| Sealant | Polymer | Viscosity (s) | Sag (inches) | Shore "A" | Peel Adhesion on Glass (kN/m) | Peel Adhesion on Aluminum (kN/m) | Tensile Stress to Failure (MPa) | Elongation at Failure Strain (%) | Modulus (MPa) |
|---|---|---|---|---|---|---|---|---|---|
| S1 | P1 | 81 | 0.03" | 31 | 2.86 | 2.18 | 1.47 | 146 | 1.01 |
| S2 | P2 | 31 | 0.02" | 41 | 1.12 | 1.81 | 1.50 | 98 | 1.53 |
| S3 | P3 | 93 (7 days 190) | 0.05" | 47 | 1.19 | 1.26 | 1.41 | 91 | 1.55 |

TABLE IV

| FORMULATION COMPONENTS | STANDARD: S4 | IMPROVED S5 |
|---|---|---|
| Polymer | 47.50% | 47.50% |
| Thixatrol ST | 6.40% | 6.40% |
| TiO2 | 4.60% | 4.60% |
| Xylene | 2.60% | |
| Isopropyl Alcohol | | 2.60% |
| A-1100 (Union Carbide) (γ-aminopropyltrimethoxysilane) | 0.20% | 0.20% |
| OS-1000 (Allied-Signal) (Methyltrimethylethylketoximosilane) | 0.90% | 0.90% |
| Limestone | 34.73% | 34.73% |
| Dibutyltin Diacetate | 0.07% | 0.07% |
| Dioctyladipate | 3.00% | 3.00% |
| VISCOSITY INDEX(S): | 28 | 25 |
| BOEING JIG SAG (INCHES): | 0.03 | 0.02 |
| PEEL ADHESION (kN/m): | | |
| GLASS | 2.3 C/F | 2.5 C/F |
| ALUMINUM | 1.8 C/F | 2.0 C/F |
| MORTAR | 2.2 C/F | 2.0 S/F |
| D-BELL MAX. STR. (MPa) | 0.95 | 0.83 |
| D-BELL MAX. STN.: | 179% | 181% |
| MOVEMENT: ±25% | PASS: | PASS: |
| ASTM C719 | G,A,Pm | G,A,Pm |
| ELASTIC RECOVERY: | Failed before being stretched to 100% | 72% |
| ISO 7389 | | |
| SHORE "A": | 28 | 21 |

To further characterize the effect of adding one or more moisture scavengers prior to or during the polymerization of the acrylate monomer(s), silane functionalized addition monomer, and optional vinyl addition comonomer; six addition polymers were prepared (P4, P5, P6, P7, P8, P9). Polymers P4–P6 were prepared with moisture scavengers consisting of isobutyltrimethoxysilane (IBTMS), methyltrimethoxysilane (MTMS) and octyltriethoxysilane (OTES) respectively present during polymerization. Polymers P7–P9 were prepared without the above moisture scavengers being present during polymerization but added during sealant compounding (about 1 day later). The polymerization components are listed in Table V and the same general procedures as samples P1–P3 were used using a polymerization temperature of 135° C.

TABLE V

PREPARATION OF POLYMERS

| | P4 | P5 | P6 | P7 | P8 | P9 |
|---|---|---|---|---|---|---|
| Butylacrylate | 88.6 | 88.6 | 88.6 | 88.6 | 88.6 | 88.6 |
| Acrylonitrile | 10.0 | 10.0 | 10.0 | 10.0 | 10.0 | 10.0 |
| Vinlytrimethoxy-silane | 0.7 | 0.7 | 0.7 | 0.7 | 0.7 | 0.7 |

TABLE V-continued

PREPARATION OF POLYMERS

| | P4 | P5 | P6 | P7 | P8 | P9 |
|---|---|---|---|---|---|---|
| Mercaptopropyl trimethoxysilane | 0.7 | 0.7 | 0.7 | 0.7 | 0.7 | 0.7 |
| Isopropyl Alcohol | 5.09 | 5.09 | 5.09 | 5.09 | 5.09 | 5.09 |
| Butylacetate | 5.54 | 5.54 | 5.54 | 5.54 | 5.54 | 5.54 |
| Initiator | 0.1 | 0.1 | 0.1 | 0.1 | 0.1 | 0.1 |
| IBTMS | 0.72 | — | — | 0.72* | — | — |
| MTMS | — | 0.12 | — | — | 0.72* | — |
| OTES | — | — | 0.72 | — | — | 0.72* |

*Added after Polymerization.

Sealants were formulated from P4–P9 using the same procedures previously set forth (except no oximes were used) and using the amounts set forth in Table VI.

TABLE VI

PREPARATION OF SEALANTS

| POLYMER P4–P9 | 49 g |
|---|---|
| Dioctyl adipate | 1 |
| Isopropyl Alcohol | 4 |
| A171 vinyltrimethoxysilane | 0.5 |
| Y11252 vinyl-methyldimethoxysilane | 1 g |
| Limestone | 34.7 |
| TiO$_2$ | 3 |
| Thixatrol ST | 6–7 |
| Condensation catalyst | 0.03–0.2 |

After the sealants were prepared they were packaged in cartridges and the cartridges stored at 23° C./50% relative humidity. The aged samples were tested after 1, 2, 3, and 4 weeks in a universal testing machine to determine the amount of force required to extrude the sealants through a 6 mm diameter aperture at rates of 12, 25, 50, 75, 100, 150, and 300 mm/min. A mean increase over 4 weeks in the force required for extrusion over the range from 12 to 300 mm/min is given in Table VII.

TABLE VII

INCREASE IN EXTRUSION FORCE OVER FOUR WEEKS

| MOISTURE SCAVENGER | MOISTURE SCAVENGER ADDED DURING POLYMERIZATION | MOISTURE SCAVENGER ADDED AFTER POLYMERIZATION |
|---|---|---|
| IBTMS | 3.9% (P4) | 25.8% (P7) |
| MTMS | 17.1% (P5) | 28.9% (P8) |
| OTES | 31.4% (P6) | 42.8% (P9) |

As can be seen in the above Table VII adding the moisture scavenger during polymerization consistently reduces the increase in extrusion force irrespective of which moisture scavenger used. It is also apparent that IBTMS is preferred over MTMS and OTES because the rate of increase is less than 4%. It is anticipated that the increase will slow down with longer aging times such as 12 months.

The hydrolyzable groups on moisture scavengers are believed to be more accessible to any adventitious moisture than the hydrolyzable groups of the silane compounds incorporated in said acrylate polymer. Thus proportionally more of the adventitious water is consumed hydrolyzing groups on the moisture scavengers than in hydrolyzing groups on said silane functionalized addition monomers and mercaptosilane chain transfer agents. The silane functionalized addition monomers and mercaptosilane chain transfer agents are incorporated into the acrylate polymers via free radical polymerization. By minimizing the hydrolyzed groups on the acrylate polymers one minimizes the possibility of the acrylate polymers crosslinking with themselves (even in the presence of active crosslinkers) because generally the pendant silyl groups need to be partially or fully hydrolyzed to participate in crosslinking through silanol reactions.

While in accordance with the Patent Statutes, a preferred embodiment and best mode has been presented, the scope of the invention is not limited thereto, but rather is measured by the scope of the attached claims.

What is claimed is:

1. A viscosity stabilized acrylic copolymer composition comprising;

the free radical initiated reaction product of at least a) at least one acrylate monomer, methacrylate monomer, or combination thereof, represented by the formula

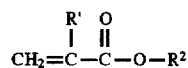

where R' is hydrogen or a methyl group, and $R^2$ is an alkyl group containing from 2 to about 9 carbon atoms;

b) from about 0.05 to about 0.95 molar parts, of at least one silane functionalized addition monomer having at least one hydrolyzable group, said silane functionalized addition monomer having the formula

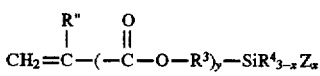

where R" is hydrogen or a methyl group, $R^3$ is an alkylene group, y is 0 or 1, $R^4$ is an alkyl group, Z is a hydrolyzable group, and x is 1, 2 or 3 said molar parts being based on 100 molar parts of the at least one acrylate monomer, methacrylate monomer, or combination thereof;

c) up to about 60 molar parts by weight of a vinyl addition monomer free of hydrolyzable groups bonded to a silicon atom and being other than an acrylate or methacrylate per 100 molar parts of said at least one acrylate monomer, methacrylate monomer, or a combination thereof;

d) up to an amount less than 1 molar part of a mercaptosilane chain transfer agent represented by the formula

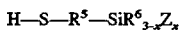

where $R^5$ is an alkylene group, $R^6$ is an alkyl group, X is 1, 2, or 3 and Z is a hydrolyzable group, wherein said molar part is based upon 100 molar parts of said at least one acrylate monomer, methacrylate monomer or a combination thereof; and e) from about 0.5 to about 4 molar parts of a polyfunctional organosilane moisture scavenger having from 2 to 4 hydrolyzable groups and not being copolymerizable through free radical reactions into said stabilized acrylic polymer said molar parts of said polyfunctional organosilane moisture scavenger being based on molar pairs of silyl groups on said copolymer from said silane functionalized addition monomer and/or said mercaptosilane.

2. An acrylic polymer according to claim 1, wherein said vinyl addition monomer c) comprises a vinyl substituted aromatic monomer, acrylonitrile monomer, methacrylonitrile monomer or combinations thereof.

3. An acrylic polymer according to claim 2, wherein said mercaptosilane is from about 0.05 to about 0.95 molar parts.

4. An acrylic polymer according to claim 1, having a viscosity increase of less than 50% as measured by extrusion through a 6 mm diameter pore upon aging one year at 23° C.

5. An acrylic polymer according to claim 4, wherein said silane functionalized addition monomer comprises a vinyl trialkoxysilane.

6. An acrylic polymer according to claim 3, wherein said silane functionalized addition monomer comprises a vinyl trialkoxysilane.

7. An acrylic polymer according to claim 6, wherein said at least one acrylate monomer, methacrylate monomer or combination thereof consists essentially of butyl acrylate.

8. A sealant formulation comprising an acrylic copolymer composition according to claim 1.

9. A process for preparing a moisture curable modified acrylic polymer sealant composition, comprising the steps of;

forming a modified acrylic polymer, said polymer derived from the reaction of at least a) at least one acrylate monomer, methacrylate monomer, or combination thereof, represented by the formula

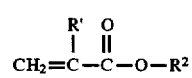

where R' is hydrogen or a methyl group, and $R^2$ is an alkyl group containing from 2 to about 9 carbon atoms;

b) from about 0.05 to about 0.95 molar parts, of at least one silane functionalized addition monomer having at least one hydrolyzable group, said silane functionalized addition monomer being represented by the formula

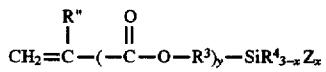

where R" is hydrogen or a methyl group, $R^3$ is an alkylene group, y is 0 or 1, $R^4$ is an alkyl group, Z is a hydrolyzable group, and x is 1, 2 or 3, said molar parts being per 100 molar parts of the at least one acrylate monomer, methacrylate monomer, or combination thereof; and c) an effective amount of vinyl substituted aromatic monomer, acrylonitrile, methacrylonitrile or combinations thereof to impart improved tensile strength, adding an effective amount of a moisture scavenger prior to completing polymerization, said moisture scavenger having from 2 to 4 hydrolyzable groups and not being free radically copolymerizable into said modified acrylic to said monomers, to stabilize the subsequently formed polymer against a viscosity increase upon exposure to moisture; and subsequently compounding said copolymer with at least one compounding agent.

10. A process according to claim 9, wherein said moisture scavengers are present during the entire polymerization.

11. A process according to claim 9, wherein an effective amount of said moisture scavengers is present before 50 wt. % of said modified acrylic polymer is formed.

12. A process according to claim 9, wherein said silane functionalized addition monomer comprises vinyl trialkoxysilane.

13. A process according to claim 9, wherein said moisture scavenger comprises isobutyltrialkoxysilane.

14. A process according to claim 12, wherein said moisture scavenger comprises isobutyltrialkoxysilane.

15. A process according to claim 9, wherein said at least one acrylate monomer, methacrylate monomer or combinations thereof comprises butyl acrylate.

16. A process according to claim 14, wherein said at least one acrylate monomer, methacrylate monomer or combinations thereof comprises butyl acrylate.

17. A process according to claim 16, wherein said at least one compounding ingredient includes a vinyltrialkoxysilane.

* * * * *